(12) United States Patent
Lampe et al.

(10) Patent No.: US 11,307,624 B2
(45) Date of Patent: *Apr. 19, 2022

(54) SYSTEM AND METHOD OF REMOTE POWER/POWER OVER ETHERNET (POE) DEVICE CONTROLS

(71) Applicant: Verint Americas Inc., Alpharetta, GA (US)

(72) Inventors: Charles Gregory Lampe, Silver Spring, MD (US); James Craig Moran, Annapolis, MD (US); Simon Gauthier, Ellicott City, MD (US)

(73) Assignee: Verint Americas Inc., Alpharetta, GA (US)

( * ) Notice: Subject to any disclaimer, the term of this patent is extended or adjusted under 35 U.S.C. 154(b) by 203 days.

This patent is subject to a terminal disclaimer.

(21) Appl. No.: 16/453,546

(22) Filed: Jun. 26, 2019

(65) Prior Publication Data
US 2019/0317583 A1 Oct. 17, 2019

Related U.S. Application Data

(63) Continuation of application No. 15/261,293, filed on Sep. 9, 2016, now Pat. No. 10,379,588.

(51) Int. Cl.
*G06F 1/26* (2006.01)
*H04L 12/10* (2006.01)
(Continued)

(52) U.S. Cl.
CPC ............ *G06F 1/266* (2013.01); *G06F 1/3287* (2013.01); *H04L 12/10* (2013.01);
(Continued)

(58) Field of Classification Search
CPC ....... G06F 1/266; G06F 1/3287; H04L 12/10; H04N 5/23206; H04N 5/23241; H04N 5/77
See application file for complete search history.

(56) References Cited

U.S. PATENT DOCUMENTS 6,011,901 A * 1/2000 Kirsten ............ G08B 13/19645
348/E7.086
6,208,379 B1 * 3/2001 Oya ....................... H04N 7/181
348/211.11
(Continued)

OTHER PUBLICATIONS

Zoumczoumc-Community Member, Cisco Support Community, Aug. 27, 2012,pp. 1-7 (Year: 2012).*
(Continued)

*Primary Examiner* — Aurel Prifti
(74) *Attorney, Agent, or Firm* — Christopher M. Scherer; DeWitt LLP

(57) ABSTRACT

A system and method configured to improve the function of a network of Power Over Ethernet (POE) devices. The system and method is configured such that a digital video recorder (DVR) actively monitors the POE devices using the POE device application programming interface (API). The DVR, in response to a POE failure or non-responsive POE status may automatically power cycle the port of the network switch corresponding to the POE device, or may power cycle (reboot) the network switch. The system and method also may notify a remote user through a wide area network (WAN) and remote monitor, allowing the remote user to alternatively manually power cycle the network switch and/or the POE(s) ports.

18 Claims, 4 Drawing Sheets

(51) Int. Cl.
   *H04N 5/77*        (2006.01)
   *H04N 5/232*       (2006.01)
   *G06F 1/3287*      (2019.01)

(52) U.S. Cl.
   CPC ..... *H04N 5/23206* (2013.01); *H04N 5/23241* (2013.01); *H04N 5/77* (2013.01)

(56) References Cited

U.S. PATENT DOCUMENTS

| | | | |
|---|---|---|---|
| 6,891,566 B2 * | 5/2005 | Marchese | G08B 13/19645 348/211.3 |
| 7,774,633 B1 | 8/2010 | Harrenstien | |
| 8,509,097 B1 | 8/2013 | Gourlay | |
| 9,794,241 B2 * | 10/2017 | Park | H04L 63/08 |
| 2002/0141732 A1 * | 10/2002 | Reese | H04N 5/765 386/223 |
| 2004/0136388 A1 * | 7/2004 | Schaff | H04N 21/2662 370/401 |
| 2005/0271128 A1 * | 12/2005 | Williams | H04L 43/0817 375/222 |
| 2009/0249112 A1 | 10/2009 | Diab | |
| 2009/0296565 A1 * | 12/2009 | Kuo | H04L 43/0876 370/219 |
| 2012/0054785 A1 | 3/2012 | Yang | |
| 2013/0132745 A1 | 5/2013 | Schoening | |
| 2013/0336627 A1 | 12/2013 | Calvert | |
| 2014/0115354 A1 | 4/2014 | Jabbaz | |
| 2014/0215254 A1 * | 7/2014 | Mandava | G06F 1/266 713/340 |
| 2014/0313882 A1 | 10/2014 | Rucker | |
| 2014/0340533 A1 | 11/2014 | Matheson | |
| 2014/0379882 A1 * | 12/2014 | Kim | H04L 41/0806 709/222 |
| 2015/0028943 A1 * | 1/2015 | Govindaraj | G06F 1/3287 327/543 |
| 2015/0244121 A1 | 8/2015 | Amelio | |
| 2015/0355708 A1 * | 12/2015 | Lee | G06F 3/0446 345/173 |
| 2016/0012603 A1 | 1/2016 | Unten | |
| 2016/0072924 A1 * | 3/2016 | Jaber | G06F 9/44505 709/203 |
| 2016/0232764 A1 * | 8/2016 | Galvin | H04N 21/274 |
| 2016/0302079 A1 * | 10/2016 | Chari | H04W 16/26 |
| 2016/0323810 A1 * | 11/2016 | May | H04L 12/4625 |
| 2016/0373816 A1 | 12/2016 | Kashikar | |
| 2017/0019294 A1 * | 1/2017 | Weiss | H04L 43/0817 |
| 2017/0111085 A1 | 4/2017 | Pera | |
| 2017/0180141 A1 | 6/2017 | Walden | |
| 2017/0244640 A1 | 8/2017 | Lin | |
| 2017/0366753 A1 | 12/2017 | Liu | |
| 2018/0054347 A1 * | 2/2018 | Kojima | H04L 41/0654 |

OTHER PUBLICATIONS

Cisco Support community, Aug. 27, 2012, pp. 1-7.*
Zoumczoumc Community Member, Cisco Support Community, Aug. 27, 2019, p. 1-7.
Zoumczoumc Community Member, Cisco Support Community, Aug. 27, 2012, p. 1-7.

* cited by examiner

SYSTEM AND METHOD OF REMOTE POWER/POWER OVER ETHERNET (POE) DEVICE CONTROLS

CROSS-REFERENCE TO RELATED APPLICATIONS

The present application is a continuation of U.S. application Ser. No. 15/261,293, filed Sep. 9, 2016, the contents of which is incorporated herein by reference in its entirety.

BACKGROUND

The present disclosure is related to the field of Power Over Ethernet (POE) device system management. More specifically, the present disclosure is related to digital video recorder (DVR) power control in a POE device system.

In current systems, when POE devices, such as remote IP cameras or sensors fail, neither the network switch nor the DVRs are configured to provide a way to power cycle or reset the POE device. In such cases, the system user must dispatch a remote crew to visit the POE device site, and manually reset the POE device and/or the network switch. Such a method and system is very expensive and inefficient.

SUMMARY OF THE DISCLOSURE

A system and method configured to improve the function of a network of Power Over Ethernet (POE) devices. The system and method is configured such that a digital video recorder (DVR) actively monitors the POE devices using the POE device application programming interface (API). The DVR, in response to a POE failure or non-responsive POE status may automatically power cycle the port of the network switch corresponding to the POE device, or may power cycle (reboot) the network switch. The system and method also may notify a remote user through a wide area network (WAN) and remote monitor, allowing the remote user to alternatively manually power cycle the network switch and/or the POE(s) ports.

In one embodiment of the present application, a method of power over Ethernet (POE) device control, the method comprises monitoring a plurality of POE devices with a digital video recorder (DVR) through a network switch with an application programming interface (API) of each of the plurality of POE devices, detecting with the DVR a nonresponsive POE device, wherein the nonresponsive POE device is one of the plurality of POE devices, and utilizing with the DVR an API of the network switch to automatically power cycle the nonresponsive POE device.

In an additional embodiment of the present application, a power over Ethernet (POE) device system, the system comprises a plurality of POE devices configured throughout a monitoring area, a digital video recorder (DVR) coupled with the plurality of POE devices through a network switch, wherein the DVR monitors the plurality of POE devices with an application programming interface (API) of each of the plurality of POE devices and detects a nonresponsive POE device, wherein the nonresponsive POE device is one of the plurality of POE devices, and further wherein the DVR utilizes an API of the network switch to automatically power cycle the nonresponsive POE device.

In an additional embodiment of the present application, a method of controlling power over Ethernet (POE) internet protocol (IP) cameras, the method comprises monitoring a plurality of IP cameras with a digital video recorder (DVR) through a network switch with an application programming interface (API), detecting with the DVR a nonresponsive IP camera, wherein the nonresponsive IP camera is one of the plurality of IP cameras, utilizing with the DVR the API of the network switch to automatically power cycle the nonresponsive IP camera, and utilizing with the DVR the API of the network switch to automatically power cycle the network switch when a predetermined number of the plurality of IP cameras are nonresponsive.

DETAILED DESCRIPTION OF THE DRAWINGS

In the present description, certain terms have been used for brevity, clearness and understanding. No unnecessary limitations are to be applied therefrom beyond the requirement of the prior art because such terms are used for descriptive purposes only and are intended to be broadly construed. The different systems and methods described herein may be used alone or in combination with other systems and methods. Various equivalents, alternatives and modifications are possible within the scope of the appended claims. Each limitation in the appended claims is intended to invoke interpretation under 35 U.S.C. § 112, sixth paragraph, only if the terms "means for" or "step for" are explicitly recited in the respective limitation.

Figure 1:
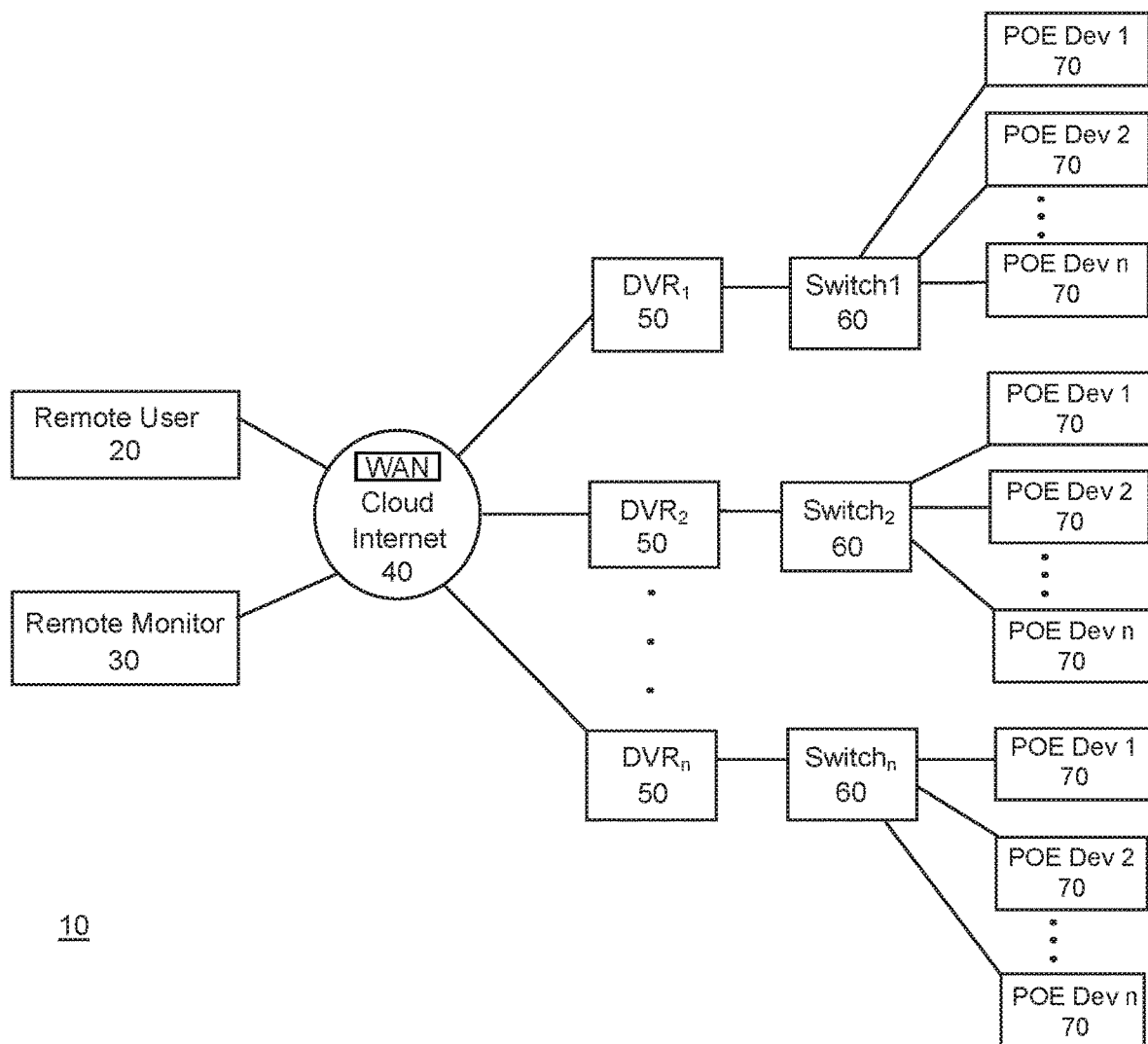
FIG. 1 is a system diagram of an exemplary system of the present application.

Referring to FIG. 1, the system of the present application adds a feature to DVRs 50 that will use the API of a network switch 60 to power cycle POE to POE devices 70 ported through the network switch 60. This provides a robust capability to recover a POE device 70 such as an IP camera or other POE devices 70 connected to the network switch 60 that have crashed or become non-responsive. This power cycle can be accomplished both automatically and/or manually.

The system improves upon previous system by giving the DVR 50 the capability to automatically power cycle the network switch 60 or any port of the network switch 60 without user input or intervention, thus power cycling any one of a plurality of POE devices 70 through its network switch port. Current systems include switches that only provide this capability by talking to the switch directly (manually). In current practice, there may be over 10,000 DVRs 50 with up to sixty-four POE devices 70 connected to each of the DVRs 50. The DVRs 50 are in many remote locations and currently users need to dispatch repair personnel to reboot POE devices 70 that have gone unresponsive. Due to the fact that many customers decide to install the network switch 60 on an isolated LAN/Switch that only the DVR 50 has access to, the user cannot access the network switch 60 directly.

Referring to FIG. 1 of the present application, a POE device system 10 is illustrated. In such systems, a plurality of POE devices 70 are installed throughout a monitoring area (not shown). The POE device 70 is typically some type of monitoring device such as a camera (in many cases an IP camera), or also could be any other POE device 70 known to be used in such a capacity such as, but not limited to, motion sensors, heat sensors, and noise sensors, among others. As is practical, a group of POE devices 70 are connected to a single network switch 60, wherein each network switch has a dedicated DVR 50. In other systems 10, configurations could be altered slightly such that there are multiple network switches 60 assigned to a single DVR 50, but the system 10 of FIG. 1 illustrates an embodiment where each network switch 60 has a dedicated DVR 50. Depending upon the number of POE devices 70 and network switches 60, the system 10 may have at least one to a plurality of DVRs 50, wherein the DVRs 50 are connected through a wide-area network (WAN) 40, to a remote monitor 30 and a remote user 20. The WAN 40 may be any known network to convey information from the DVRs 50 to the remote monitor 30 and the remote user 20. The WAN 40 may be the cloud or the internet, or any other known network as stated previously.

Still referring to FIG. 1, in operation, the POE devices 70 are running on Ethernet power, and if one goes down, i.e., fails or is unresponsive to the remote monitor 30 or DVR 50, the remote user 20 or the DVR 50 may power cycle the particular port the POE device 70 is using with the API of the network switch 60. The DVR 50 monitors the POE devices 70 using the API of the POE devices 70. This power cycle (or reboot) allows the particular POE device 70 to restart without significant cost or loss of use. It should be noted that any use of the terms nonresponsive or unresponsive is synonymous with any degree of POE device and/or network switch failure, or any degree of POE device 70 and/or network switch 60 responsiveness.

Still referring to FIG. 1, the system 10 may also allow for the DVR 50 and/or the remote user 20 to reboot or power cycle the entire network switch 60. This may be required when a number of the POE devices 70 ported to a particular network switch 60 are down or failing at the same time, or if the network switch 60 itself is unresponsive or failing. The DVR 50 and/or the remote user 20 and remote monitor 30 may also be configured such that when a firmware update is made to the system 10, the DVR 50 automatically power cycles all or a specified number of the network switches 60 after completion of the firmware update. Likewise, the remote user may choose to manually power cycle the network switch 60 at such time as well.

Still referring to FIG. 1, the detection of failure of the POE devices 70 utilizing the API of the POE devices 70 and/or the network switch 60 utilizing the API of the network switch 60 may be configured in the DVR 50, or with a remote monitor 30 connected to the network switches 60 through the WAN 40. In such cases, it is contemplated that the DVR 50 may detect and automatically power cycle the POE device 70 and/or the network switch 60 with the API of the network switch 60, or that the remote monitor 30 may instruct the DVR 50 to carry out the power cycles, or that the remote monitor 30 may prompt a remote user 20 to manually power cycle the network switch 60 and/or the POE devices 70 through the WAN 40. In cases where the DVR 50 is automatically carrying out the power cycling, the DVR does so through the API of the network switch 60.

Figure 2A:
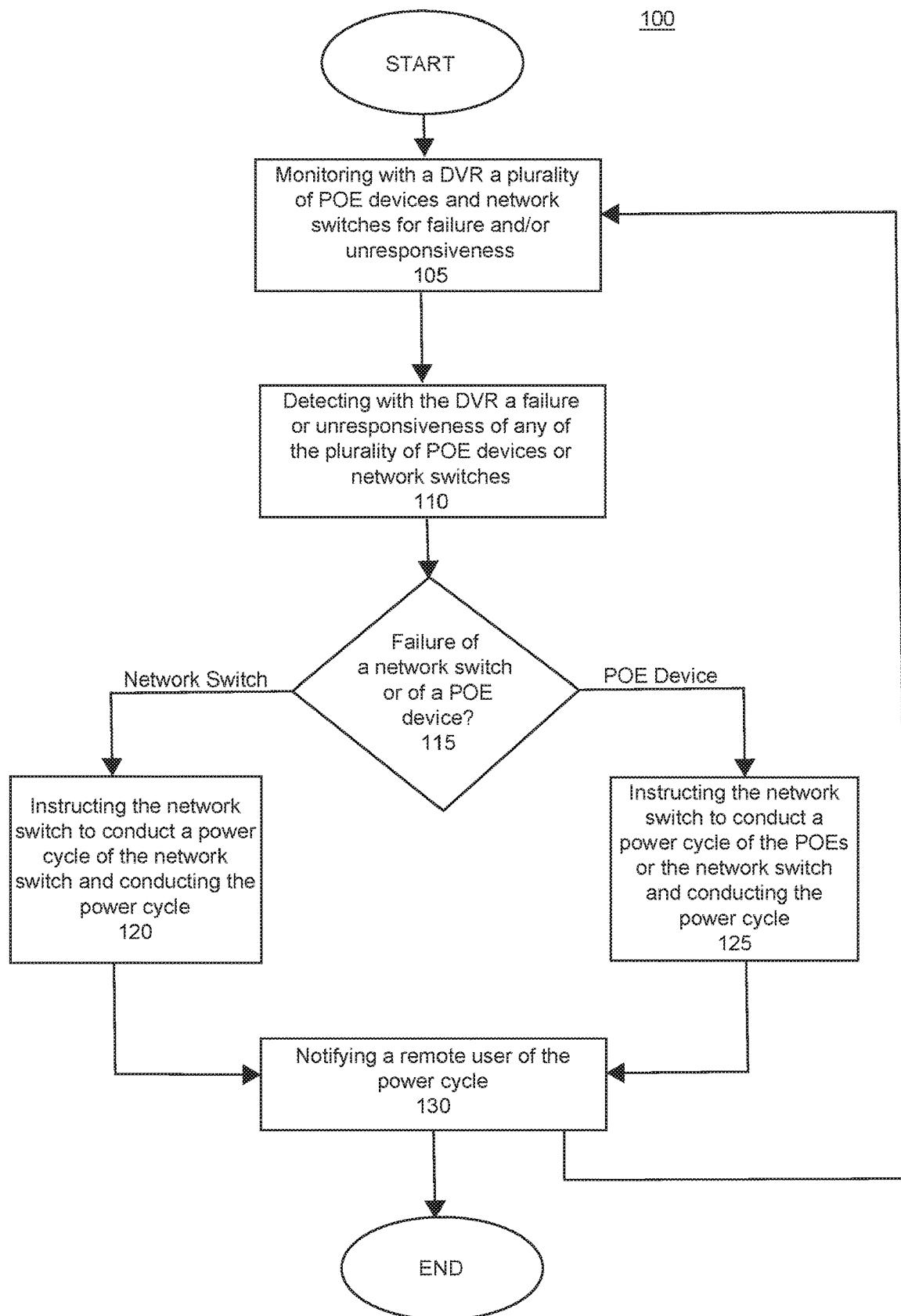
FIG. 2a and FIG. 2b are flowcharts that depict an exemplary embodiment of a method of the present application.

Referring now to FIG. 2a, a method 100 is illustrated wherein a plurality of POE devices and network switches are monitored with a DVR for failure and/or unresponsiveness in step 105. As discussed above, these POE devices and network switches may be monitored by the DVR or a remote monitor in the system. As stated previously, the POE devices are monitored using the API of the network switches. In step 110, a failure or unresponsiveness of any of the plurality of POE devices or network switches is detected with the DVR (or remote monitor). In step 115, if the reported failure is a failure of a POE device or multiple POE devices, then at step 125, the network switch is instructed to conduct a power cycle of the corresponding parts of the POE device or devices, or of the entire network switch itself, and the power cycle is conducted accordingly. In step 115, if the reported failure is of the network switch, then in step 120, the network switch is instructed to conduct a power cycle or reboot of itself and such power cycle is conducted. Once the appropriate power cycling is completed in steps 120 and/or step 125, then a remote user is notified of the power cycle in step 130, and the method either ends or repeats at step 105.

Figure 2B:
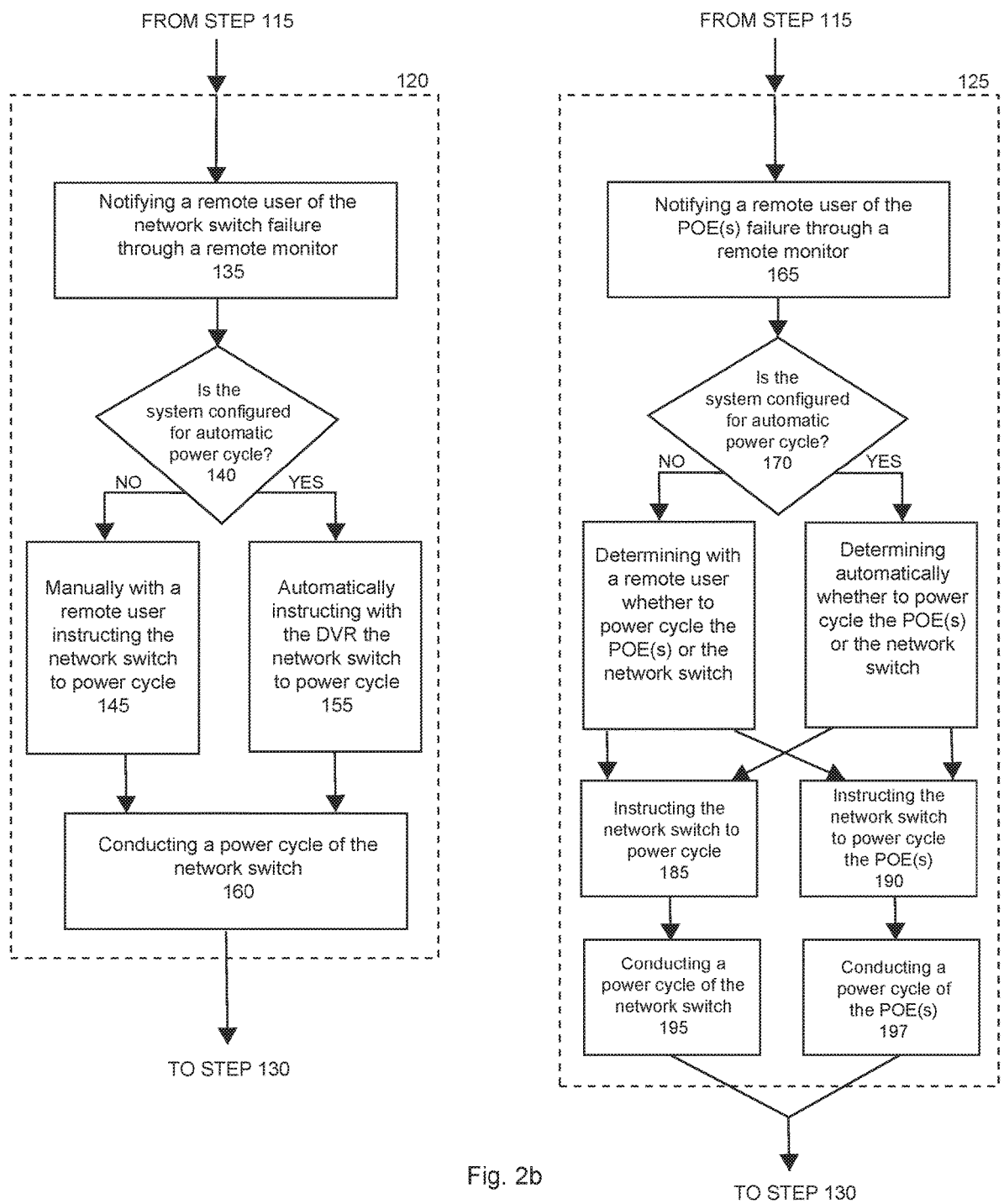

Referring now to FIG. 2b, the method 100, specifically steps 120 and 125, are described in further detail. In step 120, a remote user of the network switch failure is notified through a remote monitor connected to a DVR and the network switch through a wide-area network (WAN). In step 140, if the system is configured for automatic power cycle, then in step 155 the DVR automatically instructs the network switch to power cycle. If the system is not configured to automatically power cycle, then in step 145, a remote user instructs the network switch to power cycle manually through the WAN and the DVR. In step 160, a power cycle of the network switch is then conducted, and the method moves on to step 130.

In step 125, a remote user is notified of the POEs failure through a remote monitor. In step 170 if the system is configured for automatic power cycle, then in step 180, the DVR automatically determines whether to power cycle the POEs or the network switch according to a predetermined algorithm. In step 170, if the system is not configured to automatically power cycle, then in step 175, a remote user determines whether to power cycle the POEs or the network switch. In both steps 175 and 180, it will be determined whether to power cycle the POEs or the network switch based upon a number of factors including how many POEs for a particular network switch are unresponsive and how many POEs are ported into the particular network switch, among other factors. Step 185 illustrates the situation where the network switch is instructed to power cycle itself after either step 175 or 180, and in step 190, the network switch is instructed to power cycle the POEs. In steps 195 and 197, the network switch and POEs are power cycled, respectively, and the method moves on to step 130.

Figure 3:
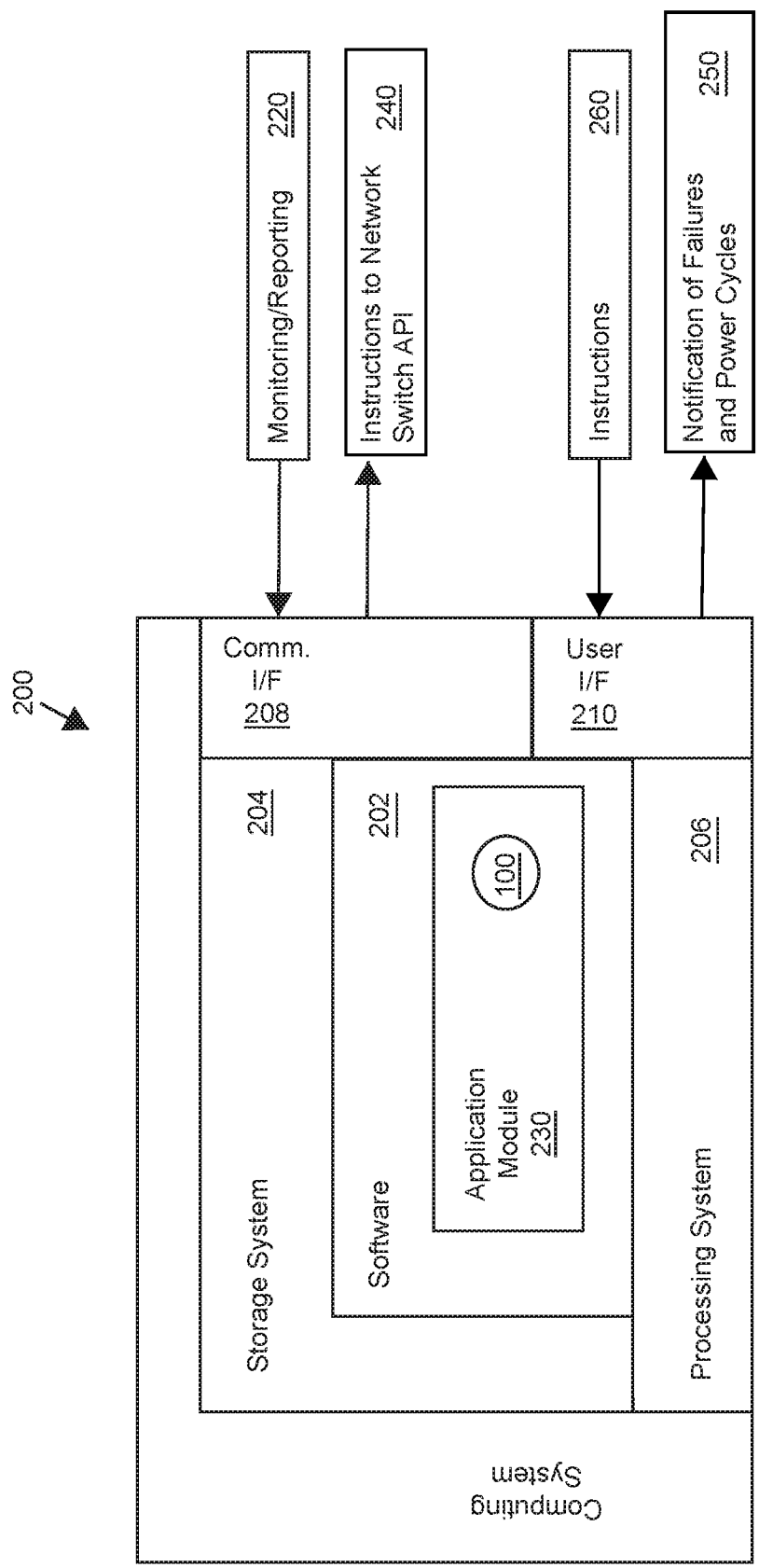
FIG. 3 is a system diagram of an exemplary embodiment of a system of the present application.

FIG. 3 is a system diagram of an exemplary embodiment of a computing system 200 for POE and network switch power cycling. The computing system 200 is generally a computing system that includes a processing system 206, storage system 204, software 202, communication interface 208 and a user interface 210. The processing system 206 loads and executes software 202 from the storage system 204, including a software module 230. When executed by the computing system 200, software module 230 directs the processing system 206 to operate as described in herein in further detail in accordance with the method 100, and FIGS. 2a-2b.

Although the computing system 200 as depicted in FIG. 3 includes one software module in the present example, it should be understood that one or more modules could provide the same operation, particularly with module being located possibly in a plurality of DVRs. Similarly, while description as provided herein refers to a computing system 200 and a processing system 206, it is to be recognized that implementations of such systems can be performed using one or more processors, which may be communicatively connected, and such implementations are considered to be within the scope of the description.

The processing system 206 can include a microprocessor and other circuitry that retrieves and executes software 202 from storage system 204. Processing system 206 can be implemented within a single processing device but can also be distributed across multiple processing devices or sub-systems that cooperate in executing program instructions. Examples of processing system 206 include general purpose central processing units, application specific processors, and logic devices, as well as any other type of processing devices, combinations of processing devices, or variations thereof.

The storage system 204 can include any storage media readable by processing system 206, and capable of storing software 202. The storage system 204 can include volatile and non-volatile, removable and non-removable media implemented in any method or technology for storage of information, such as computer readable instructions, data structures, program modules, or other data. Storage system 204 can be implemented as a single storage device but may also be implemented across multiple storage devices or sub-systems. Storage system 204 can further include additional elements, such a controller capable of communicating with the processing system 206.

Examples of storage media include random access memory, read only memory, magnetic discs, optical discs, flash memory, virtual and non-virtual memory, magnetic sets, magnetic tape, magnetic disc storage or other magnetic storage devices, or any other medium which can be used to store the desired information and that may be accessed by an instruction execution system, as well as any combination or variation thereof, or any other type of storage medium. In some implementations, the storage media can be a non-transitory storage media.

User interface 210 can include a mouse, a keyboard, a voice input device, a touch input device for receiving a gesture from a user, a motion input device for detecting non-touch gestures and other motions by a user, an application running on a remote computer that communicate with the DVR through a network (LAN/WAN) and other comparable input devices and associated processing elements capable of receiving user input from a user. In embodiments, the user interface 210 operates to present and/or to receive information to/from a user of the computing system. Output devices such as a video display or graphical display can display an interface further associated with embodiments of the system and method as disclosed herein. Speakers, printers, haptic devices and other types of output devices may also be included in the user interface 210. In an exemplary embodiment, the user interface 210 may operate to receive instructions 260 from a remote user that instruct the computing system 200 to provide instructions regarding whether to power cycle any of the network switches and/or POEs according to the system and method described above, specifically with respect to execution of embodiments of the method 100. Furthermore, the user interface 210 may operate to also send out notifications to the remote user of failures in power cycles 250 as further described above with respect to the system 10 and the execution of the method 100.

As described in further detail herein, the computing system 200 receives and transmits data through the communication interface 208. In embodiments, the communication interface 208 operates to send and/or receive data to/from other devices to which the computing system 200 is communicatively connected. In the computing system 200, the communication interface 208 is configured to receive monitoring and reporting notifications 220 from the network switches and/or POEs showing failures of any of such elements, and according to the method 100, the communication interface 208 outputs instructions to the network switch API 240 instructing the same to power cycle the network switch and/or the POEs, again according to the method 100.

The functional block diagrams, operational sequences, and flow diagrams provided in the figures are representative of exemplary architectures, environments, and methodologies for performing novel aspects of the disclosure. While, for purposes of simplicity of explanation, the methodologies included herein may be in the form of a functional diagram, operational sequence, or flow diagram, and may be described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology can alternatively be represented as a series of interrelated states or events, such as in a state diagram. Moreover, not all acts illustrated in a methodology may be required for a novel implementation.

In the foregoing description, certain terms have been used for brevity, clearness, and understanding. No unnecessary limitations are to be inferred therefrom beyond the requirement of the prior art because such terms are used for descriptive purposes and are intended to be broadly construed. The different configurations, systems, and method steps described herein may be used alone or in combination with other configurations, systems and method steps. It is to be expected that various equivalents, alternatives and modifications are possible within the scope of the appended claims.

What is claimed is:

1. A method of power over Ethernet (POE) device control, the method comprising:
   monitoring a plurality of POE devices by a digital video recorder (DVR) through a network switch with an application programing interface (API) for nonresponsive POE devices;
   detecting by the DVR all nonresponsive POE devices connected to the network switch;
   based on the detecting, determining a number of nonresponsive POE devices connected to the network switch and
   utilizing the DVR to automatedly instruct the API of the network switch to power cycle the network switch when a predetermined number of the plurality of POE devices are detected nonresponsive by the DVR.

2. The method of claim 1, wherein the plurality of POE devices and the DVR are wired or wirelessly connected to the network switch.

3. The method of claim 1, wherein the plurality of POE devices are internet protocol (IP) cameras.

4. The method of claim 1, wherein the plurality of POE devices are sensors.

5. The method of claim 1, further comprising automatically utilizing the DVR to instruct the API of the network switch to power cycle all ports on the network switch corresponding to the nonresponsive POE devices when the number of nonresponsive POE devices is less than the predetermined number.

6. The method of claim 5, wherein the predetermined number is based on the number of nonresponsive POE devices for the network switch and a total number of POE devices that are connected to the network switch.

7. The method of claim 1, wherein the predetermined number is determined for each network switch, further wherein the number of POE devices and the number of nonresponsive POE devices is determined for each network switch.

8. The method of claim 1, further comprising notifying a remote user of the nonresponsive POE device, wherein the notification is sent through a wide area network (WAN) from the DVR to the remote user.

9. The method of claim 8, further comprising notifying the remote user when the DVR instructs the API of the network switch to automatically power cycle the nonresponsive POE device or network switch.

10. A power over Ethernet (POE) device system, the system comprising:
   a plurality of POE devices configured throughout a monitoring area;
   a digital video recorder (DVR) coupled with the plurality of POE devices through a network switch, wherein the DVR monitors the plurality of POE devices for nonresponsive POE devices with an API of the network switch, detects all nonresponsive POE devices connected to the network switch and, based on the detection, determines a number of nonresponsive POE devices, further wherein the DVR automatically instructs the API of the network switch to power cycle the network switch when a predetermined number of the plurality of POE devices are detected nonresponsive by the DVR.

11. The system of claim 10, wherein the plurality of POE devices and the DVR are wired or wirelessly connected to the network switch.

12. The system of claim 10, wherein the plurality of POE devices are internet protocol (IP) cameras.

13. The system of claim 10, wherein the plurality of POE devices are sensors.

14. The system of claim 10, wherein the DVR automatically instructs the API of the network switch to power cycle all ports on the network switch corresponding to the nonresponsive POE devices when the number of nonresponsive POE devices is less than the predetermined number.

15. The system of claim 14, wherein the predetermined number is based on the number of nonresponsive POE devices for the network switch and a total number of POE devices that are connected to the network switch.

16. The system of claim 10, wherein the number of POE devices and the number of nonresponsive POE devices is determined for each network switch.

17. The system of claim 10, wherein the DVR notifies a remote user of the nonresponsive POE device, wherein the notification is sent through a wide area network (WAN) from the DVR to the remote user.

18. The system of claim 17, wherein the DVR notifies the remote user when the DVR instructs the API of the network switch to automatically power cycle the nonresponsive POE device or network switch.

* * * * *